(12) United States Patent
Pirovano et al.

(10) Patent No.: US 11,720,617 B2
(45) Date of Patent: Aug. 8, 2023

(54) METHOD AND SYSTEM FOR AUTOMATED GENERATION AND EDITING OF EDUCATIONAL AND TRAINING MATERIALS

(71) Applicant: Docebo Spa a Socio Unico, Milan (IT)

(72) Inventors: Fabio Pirovano, Sovico (IT); Alberto Galimberti, Briosco (IT); Giuseppe Valetto, Turin (IT)

(73) Assignee: Docebo Spa a Socio Unico, Milan (IT)

( * ) Notice: Subject to any disclaimer, the term of this patent is extended or adjusted under 35 U.S.C. 154(b) by 0 days.

(21) Appl. No.: 17/224,294

(22) Filed: Apr. 7, 2021

(65) Prior Publication Data

US 2021/0319053 A1    Oct. 14, 2021

Related U.S. Application Data

(60) Provisional application No. 63/006,767, filed on Apr. 8, 2020.

(51) Int. Cl.
*G06F 16/34* (2019.01)
*G06F 40/166* (2020.01)
*G06N 3/04* (2023.01)
*G06N 3/045* (2023.01)
*G06F 40/103* (2020.01)
*G06F 40/279* (2020.01)
*G06N 3/047* (2023.01)

(52) U.S. Cl.
CPC .......... *G06F 16/345* (2019.01); *G06F 40/166* (2020.01); *G06N 3/04* (2013.01); *G06N 3/045* (2023.01); *G06F 40/103* (2020.01); *G06F 40/279* (2020.01); *G06N 3/047* (2023.01)

(58) Field of Classification Search
CPC ....... G06N 3/04; G06N 3/0454; G06F 16/345
See application file for complete search history.

(56) References Cited

U.S. PATENT DOCUMENTS

| | | |
|---|---|---|
| 6,884,074 B2 | 4/2005 | Theilmann |
| 8,504,482 B1 | 8/2013 | Kortemeyer et al. |
| 9,099,010 B2 | 8/2015 | Ediger et al. |
| 10,373,279 B2 | 8/2019 | Zaslavsky et al. |
| 11,010,436 B1 * | 5/2021 | Peng ................ G06F 16/248 |

(Continued)

OTHER PUBLICATIONS

Chidambaram et al., "Learning Cross-Lingual Sentence Representations via a Multi-task Dual-Encoder Model", , Google AI, Mountain View, CA, 2019, pp. 1-10.

(Continued)

*Primary Examiner* — Scott T Baderman
*Assistant Examiner* — Seung Woon Jung
(74) *Attorney, Agent, or Firm* — The Webb Law Firm

(57) ABSTRACT

The present invention provides a method and system for the automated generation or editing of educational or training materials whose content is based on predetermined parameters. The method and system extract information from pre-existing sources, divide the information into blocks based on the predetermined parameters, summarize the blocks' information, generate keywords, key phrases and/or confidence scores for each block of information, retrieve content from pre-existing sources using the keywords, key phrases and/or confidence scores, and assemble the retrieved content to create the educational or training materials.

22 Claims, 1 Drawing Sheet

(56) References Cited

U.S. PATENT DOCUMENTS

| | | |
|---|---|---|
| 11,265,610 B2 * | 3/2022 | Glennon ............ H04N 21/4828 |
| 2003/0152903 A1 | 8/2003 | Theilmann |
| 2009/0305201 A1 | 12/2009 | Gorup et al. |
| 2011/0270873 A1 | 11/2011 | Somanchi et al. |
| 2012/0239648 A1 | 9/2012 | Lawlor |
| 2015/0242974 A1 | 8/2015 | Zaslavsky et al. |
| 2015/0242975 A1 | 8/2015 | Zaslavsky et al. |
| 2015/0242976 A1 | 8/2015 | Zaslavsky et al. |
| 2015/0242978 A1 | 8/2015 | Zaslavsky et al. |
| 2016/0163211 A1 | 6/2016 | Piper et al. |
| 2017/0186331 A1 * | 6/2017 | Lawrenson ............ G09B 19/00 |
| 2018/0189292 A1 * | 7/2018 | Grace, Jr. ......... G06F 16/24578 |
| 2020/0065857 A1 * | 2/2020 | Lagi ...................... G06N 7/005 |
| 2020/0160740 A1 * | 5/2020 | Nedivi ..................... G09B 5/06 |
| 2020/0175268 A1 * | 6/2020 | Lewis .................... G06N 3/088 |
| 2021/0141997 A1 * | 5/2021 | Pinnamaneni ...... G06F 16/9566 |

OTHER PUBLICATIONS

Koshorek et al., "Text Segmentation as a Supervised Learning Task", School Of Computer Science, Tel-Aviv University, Israel, 2018, pp. 1-5.

Lewis et al., "BART: Denoising Sequence-to-Sequence Pre-training for Natural Language Generation, Translation, and Comprehension", Facebook AI, 2019, pp. 1-10.

Vaswani et al., "Attention Is All You Need", 31st Conference on Neural Information Processing System, (NPIS 2017), Long Beach, CA 2017, pp. 1-15.

Yang et al., "Multilingual Universal Sentence Encoder for Semantic Retrieval", Google AI, Mountain View, CA and Cambridge, MA, 2019, pp. 1-6.

\* cited by examiner

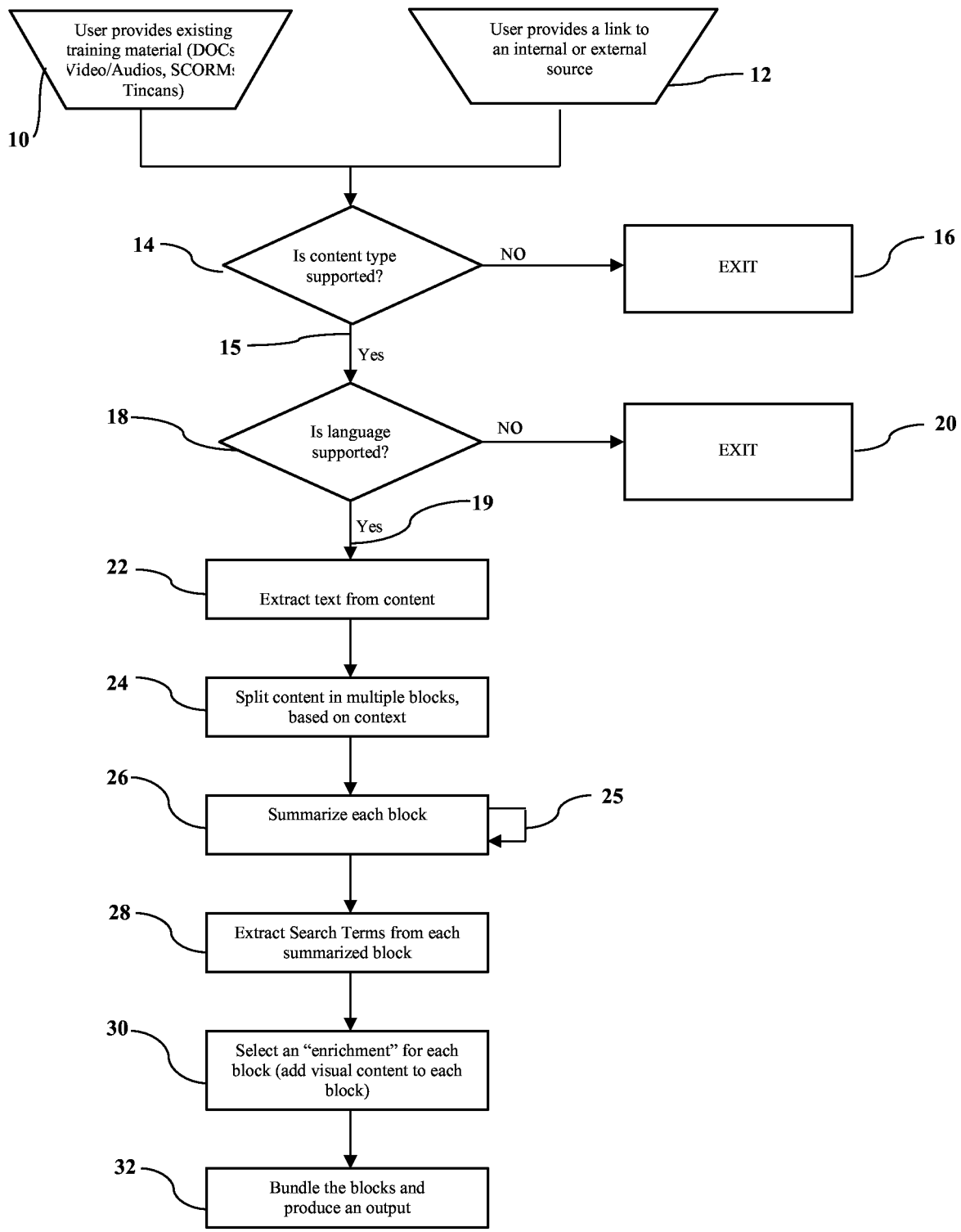

METHOD AND SYSTEM FOR AUTOMATED GENERATION AND EDITING OF EDUCATIONAL AND TRAINING MATERIALS

CROSS-REFERENCE TO RELATED APPLICATION

This application claims priority to U.S. Provisional Application No. 63/006,767 filed Apr. 8, 2020, the disclosure of which is hereby incorporated by reference in its entirety

BACKGROUND OF THE INVENTION

Field of the Invention

This invention relates to a method and system for the automated generation or editing of educational or training materials, such as materials for e-learning courses. In particular, the method and system of the present invention employ an algorithm that selects parcels of information from existing materials and publications according to certain criteria, and assembles the selected parcels into course materials useful for educational or training purposes.

Description of Related Art

Creating educational and training materials, including for an e-learning course, can be a very time-consuming and expensive operation because the process typically includes the general steps of gathering information from various sources, analyzing the information, and designing, developing and evaluating an object of the course, and then preparing the materials to create the new e-learning course.

More particularly, the creation of the educational and training materials for the e-learning course follows a somewhat standard process for developing new e-learning training materials that can require at least five people working for an average of up to 60 days to complete. This typical standard process includes the following steps.

First step: Initial Kickoff Meeting. A team of content creators is organized, which then meets with the internal or external client who has commissioned the creation or editing of materials for the e-learning course. The object of this initial meeting is to gather information about e-learning course, such as the intended audience, content, prerequisites, technical constraints and schedule for preparing the materials.

Second step: Analysis of the Course Requirements. Whenever possible, members of the team interview and observe audience members at the start to obtain information about any knowledge gaps that the audience members may have, and about any particular needs they may have. The team members can then analyze information about the intended audience and content of the course from this first-hand vantage point.

Third step: Design and Prototyping of Course Materials. The team then prepares design documents and/or prepares prototypes of the types of materials that may be used for the e-learning course. The design documents, which show the objectives of the course, proposed organization of content, and proposed creative treatment are reviewed with the client and, if prototypes were created, they are demonstrated to the client. The team receives feedback from the client that is then used by the team to modify the design documents and/or prototypes if necessary. The client's feedback is then used in the initial development of the materials for the e-learning course.

Fourth step: Development of the Materials. After receiving the client's approval of the design and/or prototypes, the team may prepare further versions of the prototypes or may proceed to prepare storyboards and/or slides showing all the text, audio, script, graphics/video that will be included the materials for the e-learning course). The storyboards and/or slides are then presented to the client for further input, and modified and edited as necessary based on the client's input.

Fifth step: Production of Materials. Upon receiving the client's approval of each storyboard and slides, the team creates and assembles the required content, graphics, animations, interactions, video and/or audio segments to create the materials for the e-learning course.

Sixth step: Testing and Quality Assurance of the Materials. Once the materials have been created, they are tested to ensure they meet the client's needs. The materials may then be revised, modified and edited as necessary to create the final version of the educational and training materials for the e-learning course.

Seventh step: Delivery of the Materials. The finished materials for the e-learning course are delivered to the client and integrated with other e-learning courses or imported into a Learning Management System (LMS) managed by the client.

Eighth step: Evaluating the Materials. Feedback from learners and users of the educational and training materials is collected via the client's LMS, and the materials may be again revised, modified and edited as necessary to incorporate the feedback.

There have been processes and systems disclosed in the art for the creation of course materials, including materials used for e-learning courses. All these processes and systems, however, suffer from the same general drawback: they require significant input from humans, especially at the step of deciding what content to include in the materials. For example, U.S. Pat. No. 6,884,074, entitled Dynamic Composition of Restricted e-Learning Courses, discloses a methods and systems for automatically composing a course starting from a complete pre-existing course based on the needs and budget of the client/students. However, this process and system requires the generation and use of a "distance" between "related elements" and a "target element" and then combining the related and target elements if the distance between them meets certain criteria to create the course materials.

U.S. Pat. No. 8,504,482, entitled System and Method for Preparing Educational Materials, discloses the possibility of creating a course by "aggregating" information from multiple sources, and maintaining this course updated if the content of the sources changes. This system and method requires the use of an assembly tool by the users to assemble the materials together.

U.S. Pat. No. 9,099,010, entitled Content Authoring Application, describes a generic authoring application that provides the user a suite of editing tools that allow the user to create training materials manually.

U.S. Pat. No. 10,373,279, entitled Dynamic Knowledge Level Adaptation of e-Learning Datagraph Structures, describes a system that provides the student content that is based on the student's knowledge level about a particular topic. The system also proposes practice items to the student, which is also based on the student's knowledge level.

Other methods and systems are disclosed in US published application nos. 20090305201A1, 20110270873A1, 20120239648A1, 20150242974A1, 20150242975A1, 20150242976A1, 20150242978A1 and 20160163211A1. All these methods and system require some level of human input to create the course materials. For example, US published application no. 20090305201A1 describes a method and system for creating hybrid e-learning courses associated with consuming organizations downstream of the publisher. Significant input from a user is required to update the course materials. In US published application no. 20110270873A1, the method concerns researching learning objects in a repository via meta-tags in an authoring tool or in an LCMS (learning content management system). In this way, the instructor/user searches for a particular learning object and reuse it in multiple courses. US published application no. 20120239648A1 describes a system to integrate the content of a course with some external references and other correlated media in a dynamic way. Searches of the external references are carried out with input from the users via a user interface. US published application nos. 20150242974A1, 20150242975A1, 20150242976A1 and 20150242978A1 appear to be related and provide a system to identify the relationships of concepts inside an e-learning course. The relationships are then mapped as a graph in a data store, where nodes are the knowledge entities (e.g. concepts) and the edges identify the relationship between them. Then, based on the learner's attitude and knowledge, a course can be served in a dynamic way to best fit the learner needs. US published application no. 20160163211A1 describes techniques for generating course materials according to pre-set rules. The rules are received from users, as are the course components.

SUMMARY OF THE INVENTION

Although it is known in the art to create and edit educational and training materials for various types of courses, there remains a need for a method and system for the automated generation or editing of these types of materials, such as materials for e-learning courses, where human input is minimized, especially at the step where the contents of the materials are chosen, edited and assembled into the final educational and training materials.

Accordingly, one aspect of the present invention provides a method that is performed by one or more processing devices for the automated generation or editing of educational or training materials whose content is based on predetermined parameters about one or more of an intended audience for the materials, purpose of the materials, technical constraints and schedule for preparing the material, the method comprising the steps of:
(a) extracting from a pre-existing source extracts of information that corresponds to the predetermined parameters;
(b) dividing or splitting the extracted information into two or more blocks of information based on the predetermined parameters;
(c) summarizing each block's information using the steps of machine reading the block's information and then either selecting the most relevant information based on the predetermined parameters or generating additional information based on the predetermined parameters, to create summarized blocks of information;
(d) generating keywords, key phrases and/or confidence scores, for each block based on the summarized blocks of information;
(e) searching for and retrieving from one or both of the pre-existing source and a second pre-existing source, using the keywords, key phrases and/or confidence scores, one or more of written content, images, audio clips, video clips and other electronic content that correspond to and are relevant to the predetermined parameters; and
(f) assembling the retrieved written content, images, audio clips, video clips and/or other electronic content to create the educational or training materials.

In a further aspect, the present invention provides a system for the automated generation or editing of educational or training materials whose content is based on predetermined parameters about one or more of an intended audience for the materials, purpose of the materials, technical constraints and schedule for preparing the material, the system comprising one or more processors configured to:
(a) extract from a pre-existing source extracts of information that correspond to the predetermined parameters;
(b) divide or split the extracted information into two or more blocks of information based on the predetermined parameters;
(c) summarize each block's information using the steps of machine reading the block's information and then either selecting the most relevant information based on the predetermined parameters or generating additional information based on the pre-determined parameters, to create summarized blocks of information;
(d) generate keywords, key phrases and/or confidence scores, for each block based on the summarized blocks of information;
(e) search for and retrieve from one or both of the pre-existing source and a second pre-existing source, using the keywords, key phrases and/or confidence scores, one or more of written content, images, audio clips, video clips and other electronic content that correspond to and are relevant to the predetermined parameters; and
(f) assemble the retrieved written content, images, audio clips, video clips and/or other electronic content to create the educational or training materials.

BRIEF DESCRIPTION OF THE DRAWING

The preferred embodiments of the present invention will be described with reference to the accompanying drawing in which:

FIG. 1 illustrates a flow chart of one preferred embodiment of the method of the present invention.

DESCRIPTION OF THE INVENTION

The preferred embodiments of the present invention will now be described with reference to the accompanying FIG. 1.

In one preferred embodiment, a method is provided that is performed by one or more processing devices. The preferred method is used for the automated generation or editing of educational or training materials, such as materials for e-learning courses. The contents of the educational or training materials is based on predetermined parameters established by input from one or more of users/students of the materials, developers of the materials, and other persons involved in the creation and editing of such educational or training materials. The predetermined parameters may include a number of different considerations known in the art, including considerations regarding the intended audience for the educational or training materials, the purpose of the materials, any technical constraints there may be in disseminating or using the educational or training materials, the schedule or deadlines for preparing the materials, etc. The pre-determined parameters may optionally also include any feedback about the materials obtained from the end users or students of the materials so that they can be edited or improved upon.

The preferred method of the present invention includes the step of extracting (22) from pre-existing sources of information (10 and 12) certain extracts of that information that corresponds to the predetermined parameters. The pre-existing sources (10 and 12) can include a number of sources of information, such as libraries of pre-existing educational, training and course materials. Examples of these types of materials include course syllabuses, textbooks, slides for presentations, etc. The pre-existing sources (10 and 12) can also include various content available via an intranet accessible to users within an organization, and content available via the internet. The pre-existing sources (10 and 12) can further include content saved in a digital library, and content available via other electronic databases or repositories.

Preferably, the pre-existing sources (10 and 12) include electronic files that can be searched using known search techniques, such as using a conventional search algorithm that retrieves information stored within some data structure. The preferred electronic files include electronic text; links to internal and external sources using Uniform Resource Locators (URL) or similar techniques; electronic documents in a known format such as PDF, DOC, DOCX, XLS, PPT and similar formats; media files such as images (JPEG, TIFF, BMP, etc.), video clips (MPEG, MP4, AVI, MOV, etc.) and audio clips (MP3, WAV, FLAC, etc.); and training material packages in formats such TinCan and Sharable Content Object Reference Model (SCORM). The preferred form of electronic files are the electronic documents in PDF, DOC, DOCX, XLS and PPT formats.

The preferred method of the present invention may optionally include the additional steps (14 and 18) of determining the electronic format and language of the information in the pre-existing sources to ensure that the format is compatible or supported by the preferred method before the extracting step described above. Once the format is determined, the preferred method can either validate (15 and 19) or discard (16 and 20) the information. The information is validated (15 and 19) if it is in a compatible format (such as one of the formats referred to above, namely PDF, DOC, DOCX, XLS, PPT, JPEG, TIFF, BMP, MPEG, MP4, AVI, MOV, MP3, WAV, FLAC, TinCan and SCORM), and the method continues to the next step. However, if the format is not in one of the compatible formats, the extracted information is discarded or rejected and not used in the method (16 and 20).

For example, format validation may be carried out by allowing plain text as an acceptable electronic format for the pre-existing sources. Thus, any pre-existing source that contains information that can be extracted as plain text or information that can be electronically transcribed as plain text, may be used. For each pre-existing source to be used as input, the preferred method of the present invention will determine if the source contains information that can be extracted as text. If yes, the preferred process will continue using the information in that pre-existing source, otherwise, the preferred process will omit using information in that pre-existing source.

Language validation of the pre-existing source is carried out, for example, by recognizing the language of the information in the pre-existing source and determining if that language is supported by system. If yes, the preferred process continues, otherwise, the preferred process will omit using information in that pre-existing source.

In the preferred embodiment, the extracting step (22) may optionally further include the steps of converting the format of the electronic files to other preferred formats. The purpose of converting the files to preferred formats is to permit the contents of the files to be more easily and readily searched. For example, speech (audio) files may be converted to text files using known converting software. Likewise, image files of typed, handwritten or printed text may be converted into machine-encoded text using known optical character recognition software, and other electronic files may be converted to machine-encoded text using a document reader system or other known system.

In a further embodiment, the extracting step (22) may be accomplished as follows. For documents in known formats, such as PDF, DOC, DOCX, XLS and PPT, the document is converted to a collection of images, with preferably one image per page of the document. Each image (corresponding to one page) is then analyzed using an object detection technique, for example, Faster R-CNN, to analyze the image and identify the key regions or segments of the image based on the content of the image. The object-detection technique Faster R-CNN incorporates contextual information that leverages the inherently localized nature of the image's content to improve the region detection performance.

Each identified region or segment of the image is then labeled and categorized accordingly. Examples of labels or categories that may be applied include, but are not limited to, title, subtitle, paragraph, footer, header, image, caption, table, table of contents, list, references, etc. Once the regions or segments are labeled and categorized, the content of each region or segment is converted into machine-encoded text using a known optical character recognition service.

Once the desired extracts of information are extracted from the pre-existing sources (10 and 12) of information, the preferred method of the present invention then includes the step of dividing or splitting (24) the extracted information into two or more blocks of information. This division or splitting is done based on the context of the extracted information and the predetermined parameters. In particular, the extracted text is segmented into smaller blocks or parcels of text while still preserving the semantic consistency of each parcel of text. This is accomplished with two different architectures merged together in one single model that, for each sentence of text, infers whether the sentence represents the end of a paragraph or not.

The first architecture used in this model is a Multi-Task Duel-Encoder model, which creates a neural representation of the input text that preserves semantic consistency. In the preferred embodiment of the present invention, multiple languages may be supported such as Arab, Chinese, Japanese and Indian. Details of a known Multi-Task Duel-Encoder model can be found here in Y. Yang et al, Multilingual Universal Sentence Encoder for Semantic Retrieval, (2019) arXiv:1907.04307 and M. Chidambaram et al, Learning Cross-Lingual Sentence Representations via a Multi-task Dual-Encoder Model, (2019) arXiv:1810.12836.

The second architecture used in this model consists of a custom implementation of a Decoder model, based on the teachings in O. Koshorek, Text Segmentation as a Supervised Learning Task (2018) arXiv:1803.09337, with the addition of the new state-of-the-art Ranger deep learning optimizer, which consists of the combination of two well-known optimizers: RectifiedAdam and LookAhead. This increases the stability of the training, and the quality of the results, leading to an 8% increase in accuracy and Matthew Correlation Coefficient score in comparison to previous methods and systems in the art.

The Multi-Task Duel-Encoder model may be replaced with other neural models, but these other models must be properly trained with a corpus of multi-language texts in a way that they provide the same semantic encoding for the same sentence in different languages. Also, the Decoder model may be replaced with other similar neural models, but in this case, if the Multi-Task Duel-Encoder has been properly trained, it can be trained only on English corpus and, without loss of accuracy, it can also perform its tasks on multi-language text.

In addition, this preferred implementation offers the ability to split text that may have different portions written in different languages, thus removing the problem of having English-only or single-language texts. As a result, the inputted text may be in any one of the supported languages, or it may contain a combination of supported languages.

After the extracted information has been divided into blocks of information, the preferred method of the present invention then includes the step of summarizing (26) each block's information. These summaries are prepared using a summarization algorithm (25) that functions by machine reading the information found in each block and distilling or summarizing the information into smaller parcels of information. The summarization algorithm (25) does this by either selecting the most relevant information in the block based on the predetermined parameters, or by generating additional information based on the predetermined parameters. The result is the creation of summarized blocks of information for each block.

The summarization algorithm (25) generates a shorter and concise version of original text while preserving as much as possible the semantically most important parts of the original text. In the preferred embodiment of the present invention, an abstractive summarization block is used that is based on an encoder-decoder sequence to sequence neural network architecture. Details of this approach and architecture are provided M. Lewis et al, BART: Denoising Sequence-to-Sequence Pre-training for Natural Language Generation, Translation, and Comprehension, (2019) arXiv:1910.13461) and A. Viswani et al, Attention Is All You Need, (2017) arXiv: 1706.03762. In other embodiments, the summarization algorithm (25) can be substituted with known technologies other than neural networks, such as (but not limited to) different forms of statistical sentence ranking, which may implement either abstractive or extractive summarization algorithms.

The summarization algorithm (25) uses as input the original text divided into paragraphs, encodes it into an internal representation, which is then used by the decoder to generate the output summaries. In the preferred embodiment of the present invention, the summarization algorithm (25) outputs one summary for each input paragraph, as shown in FIG. 1. In other embodiments, there may be different relationships between inputs and outputs, such as multi-to-one or multi-to-multi.

The preferred method then uses the summarized blocks of information to generate or extract (28) one or more keywords, key phrases and/or confidence scores, for each block. The generated keywords, key phrases and/or confidence scores are then used to search for and retrieve from one or more pre-existing sources of information content that correspond to and are relevant to the predetermined parameters. This retrieved content may be in the form of written or text content, image files, audio clips, video clips and other known electronic formats, or it may be arranged in one or more arrays of sentences associated with corresponding images, audio clips, video clips and/or other electronic content. This retrieved content is then assembled (32) to create the desired educational or training materials. As an example, the retrieved content is in the form of an array of sentences that are concatenated or linked together in a series.

Alternatively, once the retrieved content is obtained, the preferred method of the present invention may include the optional step of generating (30) enriched content from the retrieved content using a generative machine-learning model. This enriched content is created, preferably, by using search terms, also known as search queries, which are words or phrases that can be entered in a search engine to retrieve results. Specifically, the task of search term extraction is intended as a text analysis technique for extracting the most important key-phrases in a given text. Those search terms are later used as queries for searching images, videos etc. The algorithm used in the generative machine-learning model is divided into two different phases: extraction and ranking. In a preferred embodiment, the extraction phase is performed through a syntactic analysis (such as part-of-speech (POS) tagging) to identify noun phrases and to retrieve named entities. Then, those terms are ranked, for example, by statistical methods and heuristics. In other embodiments of the present invention, graph based ranking methods, or embedding similarity may be used.

The search term algorithm takes as input the summarized paragraphs, splits the paragraphs into sentences and, for each sentence, returns an ordered list of search terms. The enriched content obtained as output from the machine-learning model is then assembled (32) to create the desired educational or training materials.

After the desired educational or training materials are created, they may be uploaded to a learning management system, or to any similar system where the materials can be used easily accessed and used by the end users, typically students.

A further preferred embodiment of the present invention is a system that comprises one or more known processors and associated computer hardware. The one or more processors of the preferred system are configured to essentially carry out the preferred method of the present invention.

More particularly, the preferred system is useful for the automated generation, creation or editing of educational or training materials whose content is based on predetermined parameters that are based on one or more of the following: the intended audience for the materials, the purpose of the materials, any technical constraints to the use or dissemination of the materials, and the schedule for preparing the materials.

The one or processors used in the preferred system of the present invention are configured to extract from a pre-existing source extracts of information that correspond to the predetermined parameters; divide or split the extracted information into two or more blocks of information based on the predetermined parameters; summarize each block's information using the steps of machine reading the block's information and then either selecting the most relevant information based on the predetermined parameters or generating additional information based on the pre-determined parameters, to create summarized blocks of information; generate keywords, key phrases and/or confidence scores, for each block based on the summarized blocks of information; search for and retrieve from one or both of the pre-existing source and a second pre-existing source, using the keywords, key phrases and/or confidence scores, one or more of written content, images, audio clips, video clips and other electronic content that correspond to and are relevant to the predetermined parameters; and assemble the retrieved written content, images, audio clips, video clips and/or other electronic content to create the educational or training materials. The one or more processors may optionally also be configured to assemble the retrieved content into one or more arrays of sentences associated with corresponding images, audio clips, video clips and/or other electronic content.

Preferably, the educational or training materials are for use in an e-learning course, and the pre-existing sources include existing course materials, content available via an intranet, content available via the internet, content saved in a digital library, and content available via other electronic databases or repositories. The pre-existing sources preferably include electronic files such as electronic text, Uniform Resource Locators (URL), electronic documents in PDF, DOC, XLS, PPT or similar formats, media files such as images, video clips and audio clips, and training material packages in formats such as TinCan and Sharable Content Object Reference Model (SCORM). Most preferably, the electronic files are electronic documents.

Preferably, the one or more processors are also configured to convert any speech or audio files to text files, to convert any images of typed, handwritten or printed text into machine-encoded text using known optical character recognition software, and to convert electronic files to machine-encoded text using known document reader systems. The one or more processors are also configured to summarize each block's information by using the summarization algorithm described above, and to generate enriched content from the retrieved content using a generative machine learning model as described above. The enriched content is then assembled to create the educational or training materials, which may then be uploaded to a learning management system for use by users and students.

In the preferred embodiment, the one or more processors may optionally also be configured to determine the electronic format of the information in the pre-existing sources and to either validate the information if the information is in a compatible format or discard the information if the information is not in the compatible format. Compatible formats include those described above, namely one or more of text, PDF, DOC, DOCX, XLS, PPT, JPEG, TIFF, BMP, MPEG, MP4, AVI, MOV, MP3, WAV, FLAC, TinCan and SCORM.

Thus, as will be apparent to those skilled in the art, the preferred method and system of the present invention uses Artificial Intelligence to leverage internal and external pre-existing sources of knowledge and information, and of content libraries to produce educational and training materials used, for example in e-learning courses, in a completely automatic way. Input from humans when generating, creating or editing the educational or training materials is minimized in the preferred method and system of the present invention. This in turn results in improved efficiencies in terms of time and effort saved, and potentially results in improved quality of the materials.

It is to be understood that while certain embodiments the present invention have been described and illustrated, the present invention is not to be limited to the specific form or arrangement of steps or parts herein described and shown. It will be apparent to those skilled in the art that various changes or modifications may be made without departing from the scope of the invention and the present invention is not to be considered limited to what is shown in the drawings and described in the specification.

The invention claimed is:

1. A method, performed by one or more processing devices, for the automated generation or editing of educational or training materials whose content is based on predetermined parameters about one or more of an intended audience for the materials, purpose of the materials, technical constraints and schedule for preparing the material, the method comprising the steps of automatically:
   a. extracting from a pre-existing source extracts of information that corresponds to the predetermined parameters;
   b. dividing or splitting the extracted information into two or more blocks of information based on the context of the extracted information and the predetermined parameters to segment the extracted information while preserving the semantic consistency of each parcel of information;
   c. summarizing each block's information using a summarization algorithm comprising the steps of machine reading the block's information and then either selecting the most relevant information based on the predetermined parameters or generating additional information based on the predetermined parameters, to create summarized blocks of information;
   d. generating keywords, key phrases and/or confidence scores, for each block based on the summarized blocks of information;
   e. searching for and retrieving from one or both of the pre-existing source and a second pre-existing source, using the keywords, key phrases and/or confidence scores generated from the summarized blocks of information, one or more of written content, images, audio clips, video clips and other electronic content that correspond to and are relevant to the predetermined parameters;
   f. generating enriched content from the retrieved one or more of written content, images, audio clips, video clips and other electronic content using a generative machine learning model comprising extraction and ranking phases; and
   g. assembling the retrieved written content, images, audio clips, video clips and/or other electronic content and the enriched content to create the educational or training materials.

2. The method of claim 1, wherein the educational or training materials are for use in an e-learning course.

3. The method of claim 1, wherein the pre-existing source comprises one or more of existing course materials, content available via an intranet, content available via the internet, content saved in a digital library, and content available via other electronic databases or repositories.

4. The method of claim 1, wherein the pre-existing source comprises electronic files selected from the group consisting of electronic text, Uniform Resource Locators (URL), electronic documents in PDF, DOC, XLS, PPT or similar formats, media files such as images, video clips and audio clips, training material packages such as TinCan and Sharable Content Object Reference Model (SCORM), and mixtures thereof.

5. The method of claim 4, wherein the electronic files are electronic documents.

6. The method of claim 1, wherein the extracting step comprises an additional step selected from the group consisting of converting speech files to text files, converting images of typed, handwritten or printed text into machine-encoded text using optical character recognition, converting electronic files to machine-encoded text using a document reader system, or a mixture thereof.

7. The method of claim 1, wherein the step of summarizing each block's information comprises using a summarization algorithm wherein an abstractive summarization block is used that is based on an encoder-decoder sequence to sequence neural network architecture.

8. The method of claim 7, wherein the output of the summarization algorithm is one summary for each input paragraph.

9. The method of claim 1, wherein the second pre-existing source comprises one or more of existing course materials, content available via an intranet, content available via the internet, and content available via other electronic databases or repositories.

10. The method of claim 1, further including the step of uploading the educational or training materials to a learning management system.

11. The method of claim 1, wherein the educational or training materials are used by students, and the pre-determined parameters include feedback about the materials obtained from one or more of the students.

12. The method of claim 1, comprising the further steps of determining, prior to the extracting step, the electronic format of the information in the pre-existing source and either validating the information if the information is in a compatible format or discarding the information if the information is not in the compatible format.

13. The method of claim 12, wherein the compatible format comprises one or more of text, PDF, DOC, DOCX, XLS, PPT, JPEG, TIFF, BMP, MPEG, MP4, AVI, MOV, MP3, WAV, FLAC, TinCan and SCORM.

14. The method of claim 1, wherein the retrieved written content, images, audio clips, video clips and/or other electronic content comprises an array of sentences associated with corresponding images, audio clips, video clips and/or other electronic content.

15. The method of claim 1, wherein the extracting step comprises:
   a. converting the pre-existing source, or a page of the pre-existing source, to an image;
   b. analyzing each image to identify one or more key regions of the image based on the content of the image;
   c. labelling each key region with a label based on the content of the key region, wherein the label includes one or more of title, subtitle, paragraph, footer, header, image, caption, table, table of contents, list or reference; and
   d. converting the content of each key region to machine-encoded text.

16. A system for the automated generation or editing of educational or training materials whose content is based on predetermined parameters about one or more of an intended audience for the materials, purpose of the materials, technical constraints and schedule for preparing the material, the system comprising one or more processors configured to automatically:
   a. extract from a pre-existing source extracts of information that correspond to the predetermined parameters;
   b. divide or split the extracted information into two or more blocks of information based on the context of the extracted information and the predetermined parameters to segment the extracted information while preserving the semantic consistency of each parcel of information;
   c. summarize each block's information using a summarization algorithm comprising the steps of machine reading the block's information and then either selecting the most relevant information based on the predetermined parameters or generating additional information based on the pre-determined parameters, to create summarized blocks of information;
   d. generate keywords, key phrases and/or confidence scores, for each block based on the summarized blocks of information;
   e. search for and retrieve from one or both of the pre-existing source and a second pre-existing source, using the keywords, key phrases and/or confidence scores generated from the summarized blocks of information, one or more of written content, images, audio clips, video clips and other electronic content that correspond to and are relevant to the predetermined parameters;
   f. generate enriched content from the retrieved one or more of written content, images, audio clips, video clips and other electronic content using a generative machine learning model comprising extraction and ranking phases; and
   g. assemble the retrieved written content, images, audio clips, video clips and/or other electronic content and the enriched content and the enriched content to create the educational or training materials.

17. The system of claim 16, wherein the pre-existing source comprises one or more of existing course materials, content available via an intranet, content available via the internet, content saved in a digital library, and content available via other electronic databases or repositories, and wherein the second pre-existing source comprises one or more of existing course materials, content available via an intranet, content available via the internet, and content available via other electronic databases or repositories.

18. The system of claim 16, wherein the pre-existing source comprises electronic files selected from the group consisting of electronic text, Uniform Resource Locators (URL), electronic documents in PDF, DOC, XLS, PPT or similar formats, media files such as images, video clips and audio clips, training material packages such as TinCan and Sharable Content Object Reference Model (SCORM), and mixtures thereof.

19. The system of claim 16, wherein the processor is further configured to convert speech files to text files, convert images of typed, handwritten or printed text into machine-encoded text using optical character recognition, and convert electronic files to machine-encoded text using a document reader system.

20. The system of claim 16, wherein the one or more processors are configured to summarize each block's information by using a summarization algorithm wherein an abstractive summarization block is used that is based on an encoder-decoder sequence to sequence neural network architecture, and wherein the output of the summarization algorithm is one summary for each input paragraph.

21. The system of claim 16, wherein the one or more processors are configured to:
   a. upload the educational or training materials to a learning management system, and
   b. determine the electronic format of the information in the pre-existing source and to either validate the information if the information is in a compatible format or discard the information if the information is not in the compatible format.

22. The system of claim 16, wherein the retrieved written content, images, audio clips, video clips and/or other electronic content comprises an array of sentences associated with corresponding images, audio clips, video clips and/or other electronic content.

* * * * *

UNITED STATES PATENT AND TRADEMARK OFFICE
CERTIFICATE OF CORRECTION

| | |
|---|---|
| PATENT NO. | : 11,720,617 B2 |
| APPLICATION NO. | : 17/224294 |
| DATED | : August 8, 2023 |
| INVENTOR(S) | : Fabio Pirovano et al. |

It is certified that error appears in the above-identified patent and that said Letters Patent is hereby corrected as shown below:

In the Claims

Column 12, Lines 23-24, Claim 16, delete "and the enriched content and the enriched content" and insert -- and the enriched content --

Signed and Sealed this
Twenty-sixth Day of September, 2023

Katherine Kelly Vidal
*Director of the United States Patent and Trademark Office*